US012459784B2

(12) United States Patent
Rodriguez

(10) Patent No.: US 12,459,784 B2
(45) Date of Patent: Nov. 4, 2025

(54) ELEVATOR SYSTEM WITH COMPENSATION CHAINS HAVING VARIABLE DENSITIES

(71) Applicant: OTIS ELEVATOR COMPANY, Farmington, CT (US)

(72) Inventor: Juan Cortes Rodriguez, Singapore (SG)

(73) Assignee: OTIS ELEVATOR COMPANY, Farmington, CT (US)

(*) Notice: Subject to any disclaimer, the term of this patent is extended or adjusted under 35 U.S.C. 154(b) by 7 days.

(21) Appl. No.: 18/409,263

(22) Filed: Jan. 10, 2024

(65) Prior Publication Data

US 2025/0223134 A1 Jul. 10, 2025

(51) Int. Cl.
*B66B 7/06* (2006.01)
*B66B 19/00* (2006.01)

(52) U.S. Cl.
CPC .............. *B66B 7/068* (2013.01); *B66B 19/00* (2013.01)

(58) Field of Classification Search
CPC ..... B66B 7/068; B66B 11/0065; B66B 19/00; D07B 2501/2007; D07B 2201/2006
See application file for complete search history.

(56) References Cited

U.S. PATENT DOCUMENTS 3,768,596 A * 10/1973 Solymos ................. B66B 7/068 187/404
3,991,856 A * 11/1976 Shigeta ..................... B66B 7/06 187/404
4,716,989 A * 1/1988 Coleman ............. H01B 7/0054 187/404
4,724,929 A * 2/1988 Coleman ............. H01B 7/0823 187/414
5,509,503 A * 4/1996 Salmon ................... B66B 11/08 187/404
6,837,340 B2 * 1/2005 Strauss ................... B66B 7/068 187/266
11,161,715 B2 * 11/2021 Studer ...................... B66B 7/068
2020/0002132 A1 * 1/2020 Mosher ................ D07B 1/0686

FOREIGN PATENT DOCUMENTS

KR 20090123079 A * 12/2009

* cited by examiner

*Primary Examiner* — Minh Truong
*Assistant Examiner* — Michelle M Mudwilder
(74) *Attorney, Agent, or Firm* — CANTOR COLBURN LLP

(57) ABSTRACT

An elevator system, having: an elevator car; a counterweight; compensation cables connecting the elevator car to the counterweight, wherein the compensation cables have a same cable length as each other and each extends from a first end to a second end, wherein the compensation cables are each divided into segments, and each of the segments has a same segment length as each of the other segments, and wherein, in each of the compensation cables, adjacent ones of the segments have a segment density that differs from each other.

20 Claims, 4 Drawing Sheets

ELEVATOR SYSTEM WITH COMPENSATION CHAINS HAVING VARIABLE DENSITIES

BACKGROUND

The embodiments disclosed herein are directed to an elevator system with compensation chains and more specifically to compensation chains having variable densities.

In a rope and belt elevator system, it may be necessary to add compensation chains to the system to ensure the traction when the car or counterweight are on the top of the hoistway. When utilizing different compensation chains having different densities, a moment may be generated on the structural frame in the hoistway, and an excessive pressure may be generated within the car shoes or to the rollers.

BRIEF SUMMARY

Disclosed is an elevator system, including: an elevator car; a counterweight; compensation cables connecting the elevator car to the counterweight, wherein the compensation cables have a same cable length as each other and each extends from a first end to a second end, wherein the compensation cables are each divided into segments, and each of the segments has a same segment length as each of the other segments, and wherein, in each of the compensation cables, adjacent ones of the segments have a segment density that differs from each other.

In addition to one or more aspects of the system or as an alternate, each of the compensation cables has a same average density as each other.

In addition to one or more aspects of the system or as an alternate, in each of the segments, the segment density is constant from end to end.

In addition to one or more aspects of the system or as an alternate, in each of the compensation cables, the segments are arranged so that the segment density increases from the first end to the second end or from the second end to the first end.

In addition to one or more aspects of the system or as an alternate, in adjacent ones of the compensation cables, the segment density increases in opposite directions such that in one of the compensation cables the segment density increases from the first end to the second end and in an adjacent one of the compensation cables the segment density increases from the second end to the first end.

In addition to one or more aspects of the system or as an alternate, in each one of the compensation cables, an average segmentation density is between 1 and 2 kilograms per meter (kg/m).

In addition to one or more aspects of the system or as an alternate, the compensation cables includes a first number N1 of the compensation cables and each of the compensation cables includes a second number N2 of segments, where N1 and N2 are the same as each other.

In addition to one or more aspects of the system or as an alternate, the system includes drive belts, have a drive belt density, connected between the elevator car and the counterweight; and a travel cable, has a travel cable density, connected to the elevator car, wherein a relationship between the drive belt density, the travel cable density and a compensation cable density is: $0.8 \leq \rho(\text{drive belts})/[\rho(\text{travel cable})+\rho(\text{compensation cables})] \leq 1.2$.

In addition to one or more aspects of the system or as an alternate, the drive belts include a third number N3 of drive belts that is the same as a first number N1 of compensation cables.

In addition to one or more aspects of the system or as an alternate, the elevator car includes a top and a bottom; the drive belts are operationally connected to the top of the elevator car; the compensation cables and the travel cable are operationally connected to bottom of the elevator car; and ones of the drive belts are aligned with ones of the compensation cables.

Further disclosed is a method of manufacturing a set of compensation cables for an elevator system, including: forming the compensation cables to have a same cable length as each other such that each extends from a first end to a second end, which includes: forming each of the compensation cables with interconnected segments, and each of the segments has a same segment length as each of the other segments; and forming adjacent one of the segments, in each of the compensation cables, to have a segment density that differs from each other.

In addition to one or more aspects of the method or as an alternate, forming the compensation cables includes forming each of the compensation cables to have a same average density as each other.

In addition to one or more aspects of the method or as an alternate, forming the compensation cables includes forming each of the segments so that the segment density is constant from end to end.

In addition to one or more aspects of the method or as an alternate, forming the compensation cables includes forming each of the compensation cables such that the segments are arranged with the segment density increasing from the first end to the second end or from the second end to the first end.

In addition to one or more aspects of the method or as an alternate, the method includes arranging adjacent ones of the compensation cables so that the segment density increases in opposite directions, such that in one of the compensation cables the segment density increases from the first end to the second end and in an adjacent one of the compensation cables the segment density increases from the second end to the first end.

In addition to one or more aspects of the method or as an alternate, forming the compensation cables includes forming each of the compensation cables so that an average segmentation density is between 1 and 2 kilograms per meter (kg/m).

In addition to one or more aspects of the method or as an alternate, the method includes arranging the compensation cables so that a first number N1 of the compensation cables are in the set of compensation cables, and each of the compensation cables includes a second number N2 of segments, where N1 and N2 are the same as each other.

In addition to one or more aspects of the method or as an alternate, the method includes identifying a drive belt density of drive belts that are configured to connect between an elevator car of the elevator system and a counterweight of the elevator system; and identifying a travel cable density of a travel cable that is configured to connect to the elevator car, wherein forming the compensation cables includes forming the compensation cables such that a relationship between drive belt density, the travel cable density and a compensation cable density is: $0.8 \leq \rho(\text{drive belts})/[\rho(\text{travel cable})+\rho(\text{compensation cables})] \leq 1.2$.

In addition to one or more aspects of the method or as an alternate, the method includes identifying a third number N3 of drive belts that are utilized for the elevator car and selecting a number N1 of compensation cables to equal N3.

Further disclosed is a method of configuring an elevator car, including: operationally coupling drive belts to the top of the elevator car; and operationally connecting the compensation cables manufactured according to one or more aspects of the method disclosed above, and the travel cable, to bottom of the elevator car such that ones of the drive belts are aligned with ones of the compensation cables.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
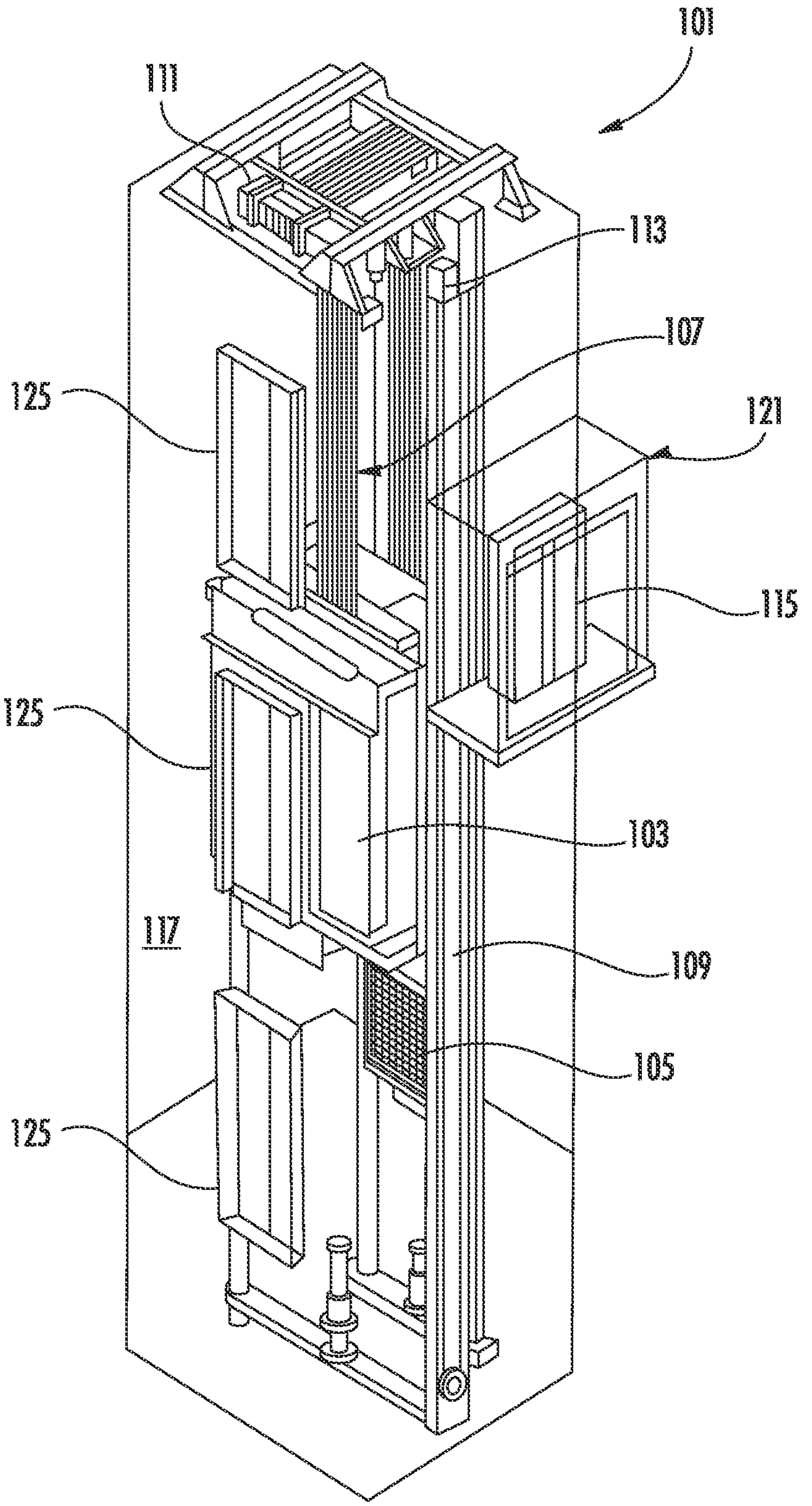
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail (or rail system) 109, a machine (or machine system) 111, a position reference system 113, and an electronic elevator controller (controller) 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft (or hoistway) 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 may be located, as shown, in a controller room 121 of the elevator shaft 117 and is configured to control the operation of the elevator system 101, and particularly the elevator car 103. It is to be appreciated that the controller 115 need not be in the controller room 121 but may be in the hoistway or other location in the elevator system. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Figure 3:
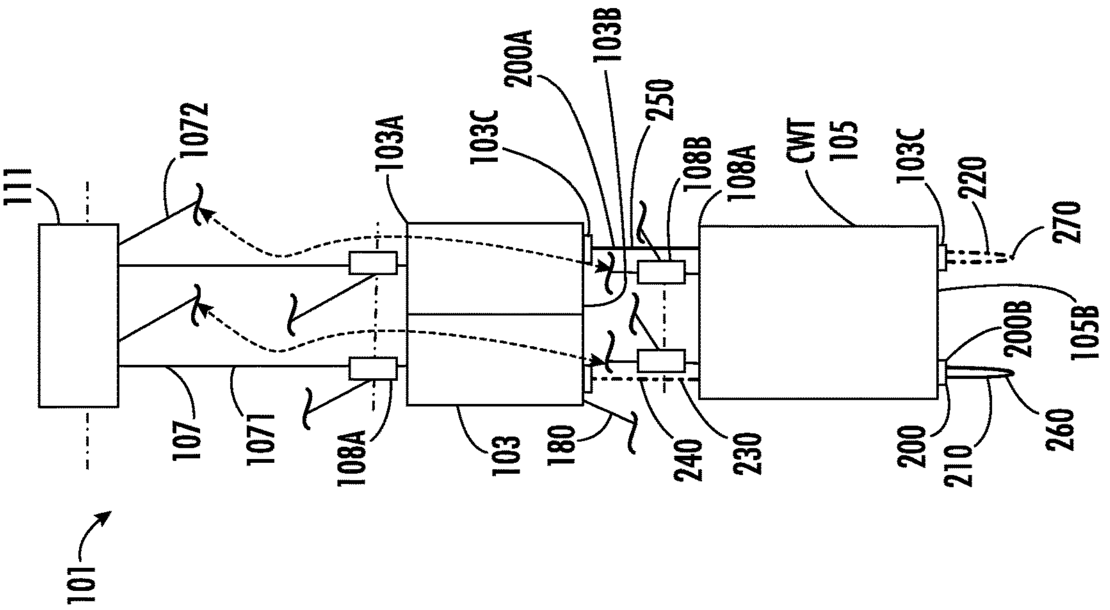
FIG. 3 shows a side view of an elevator system having compensation cables configured according to an embodiment.
Figure 2:
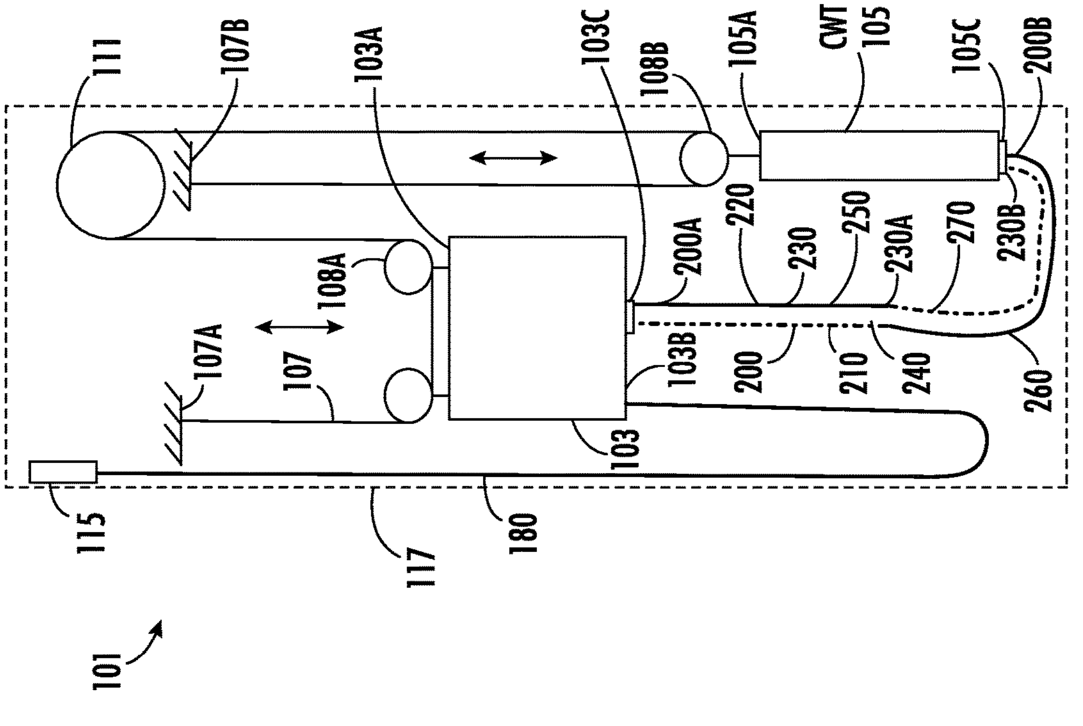
FIG. 2 shows a side view of an elevator system having compensation cables configured according to an embodiment.

Turning to FIGS. 2 and 3, additional aspects of the embodiments are shown. The embodiment includes the elevator system 101 having the elevator car 103 and the counterweight 105 connected by the belts 107 via the machine 111. First pulleys (or rollers) 108A operationally coupled to a top 103A of the car 103 provide for the operational coupling of the belts 107 to the car 103. Second pullies (or rollers) 108B operationally coupled to a top 105A of the counterweight 105 provide to for the operational coupling of the belts 107 to the counterweight 105. Two belts 1071, 1072 are shown, e.g., in the view of FIG. 3. Opposite ends of the belts 107A, 107B (FIG. 2) are fixed within or above the hoistway 117. A travel cable 180 connects the car 103 to the controller 115 (FIG. 2) within the hoistway 117.

Compensation cables 200 connect the elevator car 103 to the counterweight 105 within the hoistway 117. First and second 210, 220 compensation cables are shown. The compensation cables 200 have a same cable length as each other, end to end, i.e., first and second ends 200A, 200B. The compensation cables 200 are coupled to a bottom 103B of the elevator car 103 via car shoes 103C and a bottom 105B of the counterweight 105 via counterweight shoes 103D.

The compensation cables 200 are each divided into segments 230. Four segments 240, 250, 260, 270 are shown, two in each of the first and second compensation cables 200. Each of the segments 230 has a same segment length, end to end, i.e., third and fourth ends 230A, 230B (FIG. 2), as each of the other segments 230. In each of the compensation cables 200, adjacent ones of the segments 230 have a segment density that differs from each other. Each of the compensation cables 200 has a same average density as each other. In each of the segments 230, the segment density is constant from end to end. In each of the compensation cables 200, the segments 230 are arranged so that the segment density increases from the first end to the second end or from the second end to the first end.

In adjacent ones of the compensation cables 200, the segment density increases in opposite directions. That is, in one of the compensation cables 200, the segment density increases from the first end 200A to the second end 200B and in an adjacent one of the compensation cables 200 the segment density increases from the second end 200B to the first end 200A.

In each one of the compensation cables 200, the average segmentation density (or mass distribution) is between 1 and 2 kilograms per meter (kg/m).

The compensation cables 200 includes a first number N1 of the compensation cables 200 and each of the compensation cables 200 includes a second number N2 of segments 230. In one embodiment, N1 and N2 are the same as each other. That is, as shown in FIGS. 2 and 3, where there are two compensation cables 200, each of the cables has two segments 230.

In circumstances where there are three or four segments 230 in the compensation cables 200, as indicated, each segment in one cable would become progressively more dense either from the first to the second ends of the compensation cables 200 or vice versa. In the adjacent cable, the progression of the segment density would be the reversed. The average density in the cables would be the same as each other. The greater number of compensation cables 200 would be provided for a greater number of floors.

The drive belts 107 have a drive belt density and the travel cable 180, that has a travel cable density, connected to the elevator car 103.

A relationship between the drive belt density, the travel cable 180 density and the compensation cable density is: $0.8 \le \rho(\text{drive belts})/[\rho(\text{travel cable})+\rho(\text{compensation cables})] \le 1.2$. The density, ρ, of the drive belts 107 and travel cable 180 are constant in this equation.

The drive belts 107 include a third number N3 of drive belts 107 that is the same as the first number N1 of compensation cables 200. As shown, there are two drive belts 107 with the two compensation cables 200.

The elevator car 103 includes a top and a bottom. The drive belts 107 are operationally connected to the top of the elevator car 103. The compensation cables 200 and the travel cable 180 are operationally connected to bottom of the car 103. Ones of the drive belts 107 are aligned with ones of the compensation cables 200. This provides balance to the elevator car 103.

Figure 4:
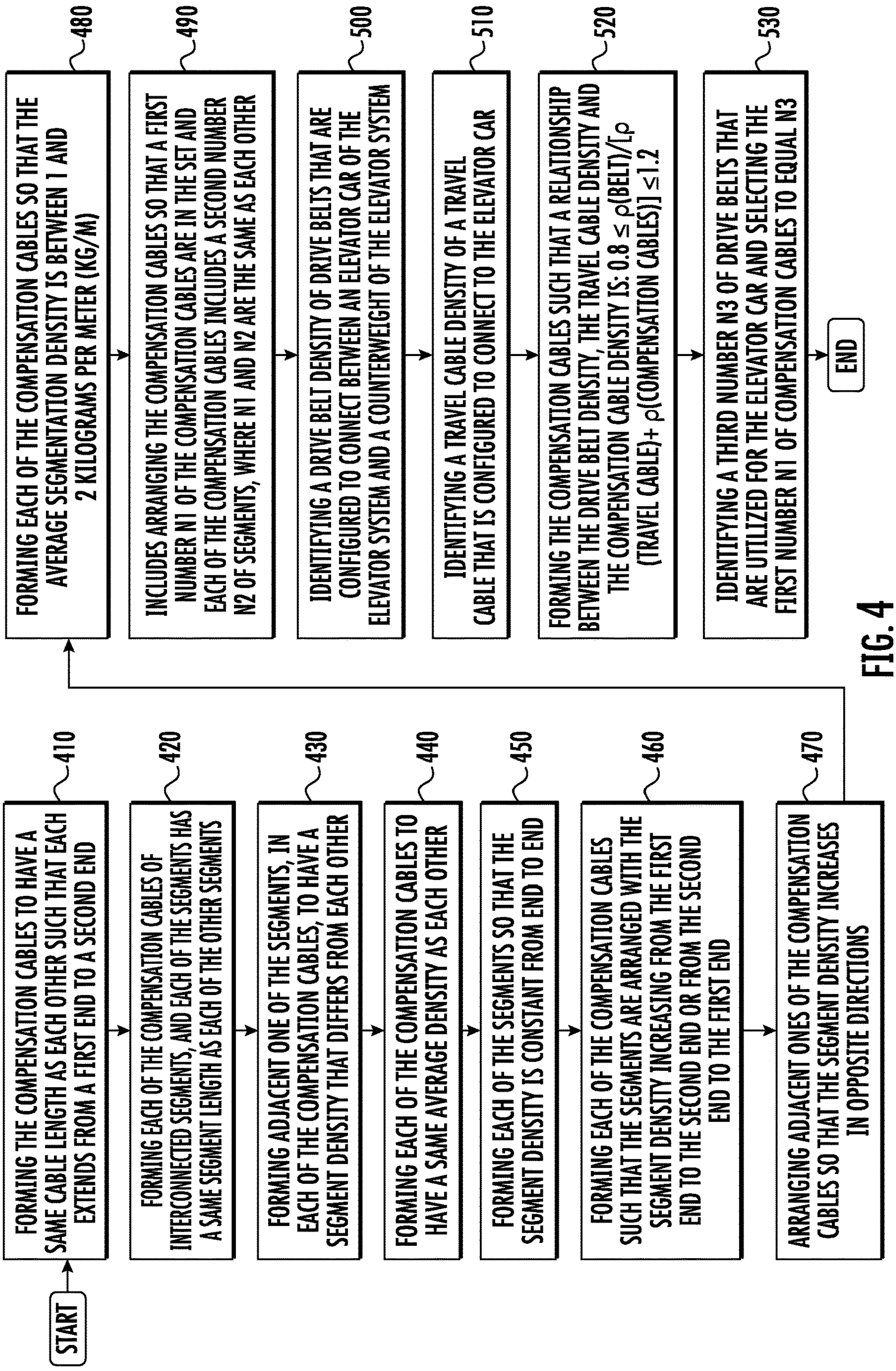
FIG. 4 shows a method of manufacturing a set of compensation cables for an elevator system according to an embodiment.

Turning to FIG. 4, a method of manufacturing a set of compensation cables 200 for an elevator system 101 is shown. As shown in block 410 the method includes forming the compensation cables 200 to have a same cable length as each other such that each extends from a first end to a second end.

As shown in block 420, forming the compensation cables 200 includes forming each of the compensation cables 200 of interconnected segments 230, and each of the segments 230 has a same segment length as each of the other segments 230.

As shown in block 430, forming the compensation cables 200 includes forming adjacent one of the segments 230, in each of the compensation cables 200, to have a segment density that differs from each other.

As shown in block 440, forming the compensation cables 200 includes forming each of the compensation cables 200 to have a same average density as each other.

As shown in block 450, forming the compensation cables 200 includes forming each of the segments 230 so that the segment density is constant from end to end.

As shown in block 460, forming the compensation cables 200 includes forming each of the compensation cables 200 such that the segments 230 are arranged with the segment density increasing from the first end to the second end or from the second end to the first end.

As shown in block 470, the method includes arranging adjacent ones of the compensation cables 200 so that the segment density increases in opposite directions, such that in one of the compensation cables 200 the segment density increases from the first end to the second end and in an adjacent one of the compensation cables 200 the segment density increases from the second end to the first end.

As shown in block 480, forming the compensation cables 200 includes forming the compensation cables 200 so that the average segmentation density in each of the compensation cables 200 is between 1 and 2 kilograms per meter (kg/m).

As shown in block 490, the method includes arranging the compensation cables 200 so that a first number N1 of the compensation cables 200 are in the set and each of the compensation cables 200 includes a second number N2 of segments 230, where N1 and N2 are the same as each other.

As shown in block 500 the method includes identifying a drive belt density of drive belts 107 that are configured to connect between an elevator car 103 of the elevator system 101 and a counterweight 105 of the elevator system 101. As shown in block 510 the method includes identifying a travel cable 180 density of a travel cable 180 that is configured to connect to the elevator car 103.

As shown in block 520, forming the compensation cables 200 includes forming the compensation cables 200 such that a relationship between the drive belt density, the travel cable 180 density and the compensation cable density is: $0.8 \le \rho(\text{belt})/[\rho(\text{travel cable } \mathbf{180})+\rho(\text{compensation cables } \mathbf{200})] \le 1.2$ As shown in block 530, the method includes identifying a third number N3 of drive belts 107 that are utilized for the elevator car 103 and selecting the first number N1 of compensation cables 200 to equal N3.

Figure 5:
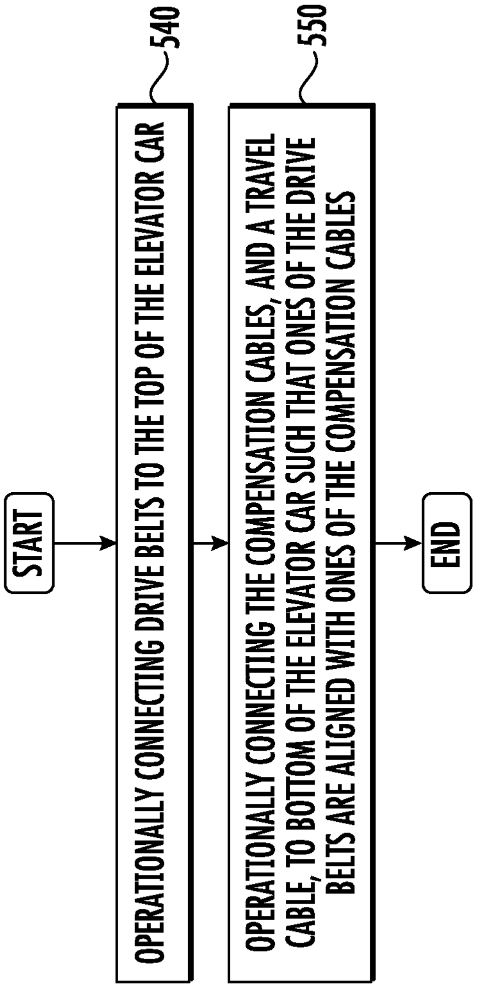
FIG. 5 shows a method of configuring an elevator car according to an embodiment.

Turning to FIG. 5, a method of configuring an elevator car 103 is shown. As shown in block 540, the method includes configuring the elevator car 103 by operationally connecting the drive belts 107 to the top of the elevator car 103. As shown in block 550 the method includes operationally connecting the compensation cables 200, and a travel cable 180, to bottom of the elevator car 103 such that ones of the drive belts 107 are aligned with ones of the compensation cables 200.

The embodiment provide the use of at least two compensation chains in which the distribution of mas is distributed equally along the compensation chains to avoiding the generation of a moment in the structural frame of the hoitway. The total length of the compensation chain is divided into segments with a distributed density from the configuration of the segments. When a car or counterweight is on top of the hoitway, the total suspended mass is optimally distributed. Benefits of the embodiments include avoiding excessive pressure on rollers or the car or counterweight shoes as a moment generated for the non-equal masses of compensation chain is minimized. Therefore, ride quality will improve.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system, comprising:

an elevator car;

a counterweight;

compensation cables connecting the elevator car to the counterweight, wherein the compensation cables have a same cable length as each other and each extends from a first end to a second end, wherein the compensation cables are each divided into segments, wherein along each of the compensation cables, the segments are connected to one another end-to-end, such that the segments are distributed along the cable length, and each of the segments has a same segment length as each of the other segments, and wherein, in each of the compensation cables, adjacent ones of the segments have a segment density that differs from each other.

2. The system of claim 1, wherein each of the compensation cables has a same average density as each other.

3. The system of claim 2, wherein in each of the segments, the segment density is constant from end to end.

4. The system of claim 3, wherein in each of the compensation cables, the segments are arranged so that the segment density increases from the first end to the second end or from the second end to the first end.

5. The system of claim 4, wherein in adjacent ones of the compensation cables, the segment density increases in opposite directions such that in one of the compensation cables the segment density increases from the first end to the second end and in an adjacent one of the compensation cables the segment density increases from the second end to the first end.

6. The system of claim 1, wherein in each one of the compensation cables, an average segmentation density is between 1 and 2 kilograms per meter (kg/m).

7. The system of claim 1, wherein the compensation cables includes a first number N1 of the compensation cables and each of the compensation cables includes a second number N2 of segments, where N1 and N2 are the same as each other.

8. The system of claim 7, including:

drive belts, have a drive belt density, connected between the elevator car and the counterweight; and a travel cable, has a travel cable density, connected to the elevator car, wherein a relationship between the drive belt density, the travel cable density and a compensation cable density is:

$$0.8 \leq \rho(\text{drive belts})/[\rho(\text{travel cable})+\rho(\text{compensation cables})] \leq 1.2.$$

9. The system of claim 8, wherein the drive belts include a third number N3 of drive belts that is the same as a first number N1 of compensation cables.

10. The system of claim 9, wherein the elevator car includes a top and a bottom;

the drive belts are operationally connected to the top of the elevator car;

the compensation cables and the travel cable are operationally connected to bottom of the elevator car; and ones of the drive belts are aligned with ones of the compensation cables.

11. A method of manufacturing a set of compensation cables for an elevator system, comprising:

forming the compensation cables to have a same cable length as each other such that each extends from a first end to a second end, which includes:

forming each of the compensation cables with interconnected segments, wherein along each of the compensation cables, the segments are connected to one another end-to-end, such that the segments are distributed along the cable length, and each of the segments has a same segment length as each of the other segments; and forming adjacent one of the segments, in each of the compensation cables, to have a segment density that differs from each other.

12. The method of claim 11, wherein forming the compensation cables includes forming each of the compensation cables to have a same average density as each other.

13. The method of claim 12, wherein forming the compensation cables includes forming each of the segments so that the segment density is constant from end to end.

14. The method of claim 13, wherein forming the compensation cables includes forming each of the compensation cables such that the segments are arranged with the segment density increasing from the first end to the second end or from the second end to the first end.

15. The method of claim 14, including arranging adjacent ones of the compensation cables so that the segment density increases in opposite directions, such that in one of the compensation cables the segment density increases from the first end to the second end and in an adjacent one of the compensation cables the segment density increases from the second end to the first end.

16. The method of claim 11, wherein forming the compensation cables includes forming each of the compensation cables so that an average segmentation density is between 1 and 2 kilograms per meter (kg/m).

17. The method of claim 11, including arranging the compensation cables so that a first number N1 of the compensation cables are in the set of compensation cables, and each of the compensation cables includes a second number N2 of segments, where N1 and N2 are the same as each other.

18. The method of claim 17, including:

identifying a drive belt density of drive belts that are configured to connect between an elevator car of the elevator system and a counterweight of the elevator system; and identifying a travel cable density of a travel cable that is configured to connect to the elevator car, wherein forming the compensation cables includes forming the compensation cables such that a relationship between drive belt density, the travel cable density and a compensation cable density is:

$$0.8 \leq \rho(\text{drive belts})/[\rho(\text{travel cable})+\rho(\text{compensation cables})] \leq 1.2.$$

19. The method of claim 18, including identifying a third number N3 of drive belts that are utilized for the elevator car and selecting a number N1 of compensation cables to equal N3.

20. A method of configuring an elevator car, comprising:

operationally coupling drive belts to the top of the elevator car; and operationally connecting the compensation cables manufactured according to the method of claim 19, and the travel cable, to bottom of the elevator car such that ones of the drive belts are aligned with ones of the compensation cables.

* * * * *